Oct. 11, 1932.  W. R. UHLEMANN  1,881,982
EYEGLASS LENS
Filed June 27, 1928  2 Sheets-Sheet 1
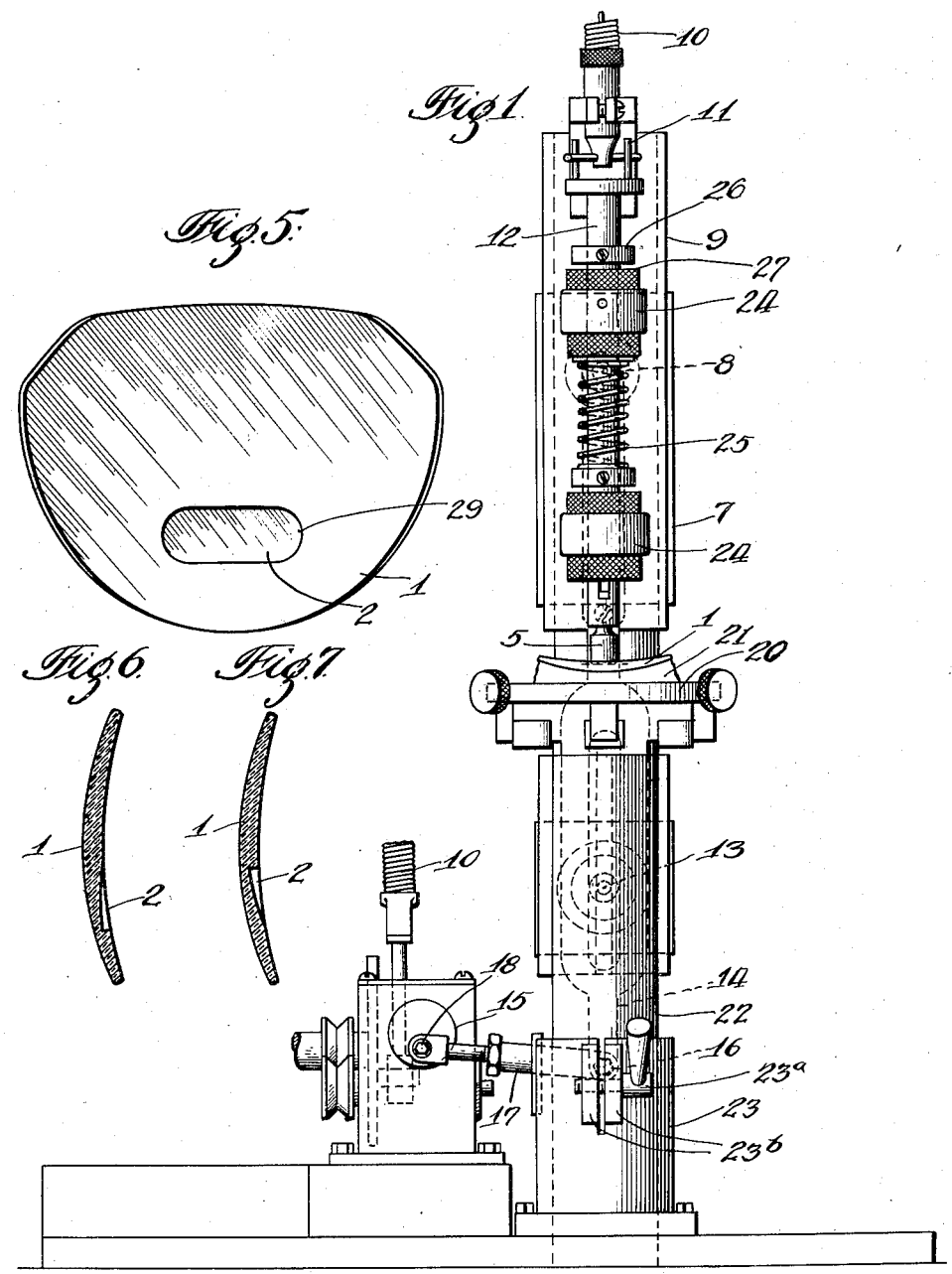
Inventor:
William R. Uhlemann
By Jones, Addington, Ames & Seibold
Attys.

Oct. 11, 1932.  W. R. UHLEMANN  1,881,982
EYEGLASS LENS
Filed June 27, 1928   2 Sheets-Sheet 2
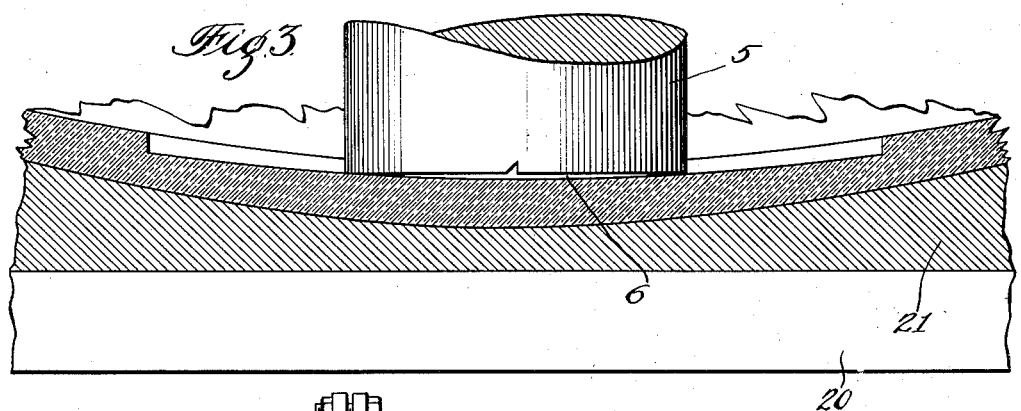
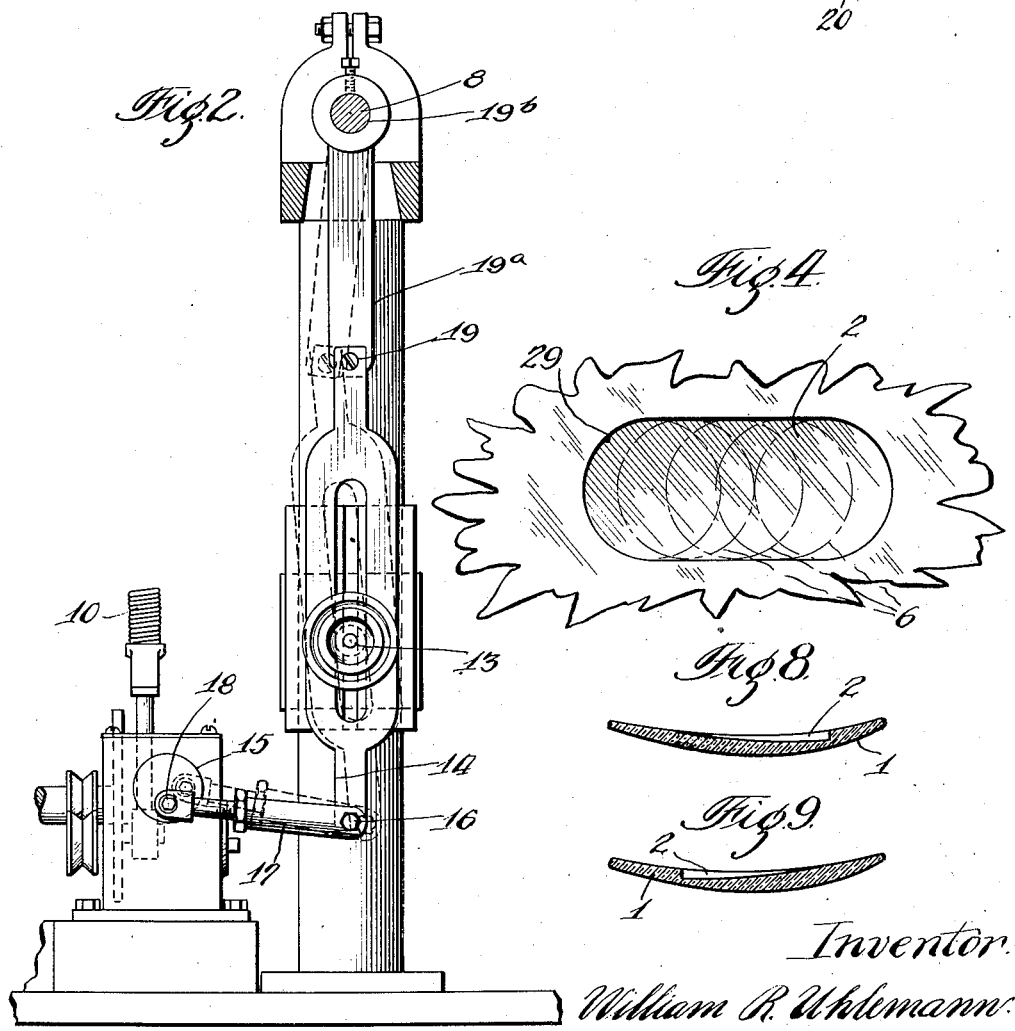
Inventor
William R. Uhlemann
By Jones, Addington, Ames & Seibold
Attys.

Patented Oct. 11, 1932

1,881,982

UNITED STATES PATENT OFFICE

WILLIAM R. UHLEMANN, OF EVANSTON, ILLINOIS, ASSIGNOR, BY MESNE ASSIGNMENTS, TO RICHARD H. UHLEMANN, OF WINNETKA, ILLINOIS, AND SAID WILLIAM R. UHLEMANN

EYEGLASS LENS

Application filed June 27, 1928. Serial No. 288,545.

My invention relates to eyeglass lenses.

One of the objects of my invention is to provide an improved bifocal lens which will have properly shaped and designed reading and distance fields and which can be ground accurately and made cheaply.

A further object of my invention is to provide a shape and design for the reading field which will give maximum comfort and vision and which will be extremely neat in appearance and satisfactory in use.

A further object of my invention is to provide a shape and design for the reading and distance fields which will permit the eye to have full range and which will act as an aid to the vision in the function of reading.

A further object of my invention is to provide an improved method for making lenses of the nature indicated above.

A further object of my invention is to devise a lens having the advantages enumerated above which can be made very cheaply.

A further object of my invention is to provide a lens having the advantages enumerated above which will be made from a single integral piece of material.

A further object of my invention is to provide a method of grinding lenses of the nature indicated above in which no grinding or heat treatment is required after the cavity is formed.

A further object of my innvention is to provide an improved lens of the nature indicated above which will avoid chromatic aberration.

Further objects will appear from the descriptions and cla:ms.

In the drawings in which my invention is illustrated—

Figure 1 is an elevational view showing in a general way apparatus suitable for manufacturing lenses of the type indicated above;

Fig. 2 is a rear view of parts of the machine shown in Fig. 1;

Fig. 3 is a greatly enlarged view showing the end of the cover and the lens mounted in position for grinding;

Fig. 4 is an enlarged plan view of a portion of the lens showing the cavity;

Fig. 5 is a plan view of the complete lens showing the reading and distance fields;

Fig. 6 is a vertical sectional view showing a modified form of lens;

Fig. 7 is a vertical sectional view showing another form of cavity;

Fig. 8 is a horizontal view showing another form of cavity; and

Fig. 9 is a horizontal sectional view showing still another form of cavity.

In making my improved lens I start with a main body portion 1 which has already been ground to lens formation for the distance vision, and cut or grind into this a cavity 2 having the proper outline for the reading vision field. This cavity in general may be formed in accordance with the disclosure in my co-pending applications Serial Nos. 214,022 and 288,546, and using a machine of the type disclosed in detail in my application Serial No. 288,547.

I will first describe the method by which the cavity is ground; next, briefly, the apparatus used in grinding; and finally the product itself.

In general, the method comprises cutting an elongated cavity 2 in one surface of the main body portion 1 of the lens by rotating a cutter 5 having a circular annular cutting edge 6 about an axis through the center of the circle of the cutting edge and perpendicular to the plane of said circle, at the same time swinging the cutter so that its axis moves with respect to the lens about a fixed axis, thereby forming an elongated cavity, the bottom surface of which is spherical and forms the envelope of the various positions of said annular cutting edge, as shown in Fig. 4, the directrix of the axis of the cutter in its swinging movement being a straight line.

In lenses of this type the radius curvature of the concave side of the main body portion of the lens may be greater or lesser than the radius of curvature of the convex side of the main body portion of the lens so as to give the desired refraction for the distance portions of the lens, and the radius curvature of the bottom surface of the cavity 2 is such that the refraction due to the part of the main body portion which remains will give the desired amount of refraction for the reading field.

As shown in Fig. 3, the grinding or cutting is effected solely by the outer edge of the bottom portion of the grinding or cutting tool, the rest of the bottom portion of the cutting tool being spaced from the bottom of the cavity due to the swinging action of the cutting tool and due to the shape of the bottom portion of the cutting tool. This shape of the bottom portion of the cutting tool may be either flat, as shown, or, if desired, concave, but it must be such that no part of the bottom portion of the cutting tool is farther from the axis about which the cutting tool swings than are the points in the circular edge of the bottom of the cutting tool.

Coming now to a description of the apparatus employed, this comprises a guide or frame 7 (Figs. 1 and 2) which can swing after the manner of a pendulum about an axis at 8, means for causing said frame or guide to swing in a definite arc about said axis, a slide 9 vertically adjustable in said guide, and swinging therewith, a grinding tool 5 rotatably mounted in said slide, so that as the guide and slide swing the rotatable cutter will swing therewith, and means for mounting the main body portion 1 of the lens in proper position to be acted on by said grinding tool in its swinging movement. Means are provided whereby the length of swing of the rotatable grinding tool may be varied for grinding cavities of different lengths as desired. The vertical adjustment of the slide enables the radius of curvature of the bottom surface of the cavity to be made anything desired within the limits of the machine.

Any suitable means may be provided for holding the slide in adjusted position on the guide, such as a set screw having a threaded engagement with the guide, and a bearing engagement with the slide.

Any suitable transmission may be provided for driving the grinding tool which will permit the swinging movement thereof, the means shown comprising a flexible shaft 10 driven from any suitable power means and having a driving clutch connection at 11 with the upper end of the shaft 12 of the grinding tool 5, the connection being such that the grinding tool may have some slight vertical play with respect to the driving member of the clutch.

Any suitable means may be provided for enabling the length of swing of the tool to be adjusted, that shown comprising a shiftable fulcrum 13 for the oscillatable actuating lever 14, so that the effective lengths of the two arms of this lever may be varied. This lever may be driven by any suitable means such as an eccentric 15 pivotally connected with the lower end of the lever 14 at 16 by means of a link 17 which is connected at 18 with the eccentric 15. The upper end of the lever has a pivotal and sliding engagement at 19 with the lower end of the oscillatable arm 19ᵃ which is secured to the rock shaft 19ᵇ to which rock shaft is secured to the guide 7 so that swinging movement of the upper end of the lever imparts a corresponding swinging movement to the lower end of the oscillatable guide 7.

The lens 1 to be ground may be mounted in any suitable manner on a vertically adjustable table 20 by heating a plastic material 21 such as sealing wax until it has the desired degree of plasticity, and then placing the lens on top of this body of plastic material and adjusting it on the plastic material until it is in the desired position with respect to the cutting tool. The table may be vertically adjustable by means of a suitable post or slide 22 to which the table is secured, while slide is vertically adjustable in a fixed guide 23 and may be held in vertically adjusted position in any suitable manner as by means of a clamping screw 23ᵃ for drawing together the split portion 23ᵇ of the guide 23.

The cutter is rotatably mounted in a pair of spaced bearings 24 on the adjustable slide, and a coil compression spring 25 is provided for yieldingly holding the cutter against the lens on which it is operating. The limit of the downward movement of the cutter is determined by means of a stop collar 26 on the rotatable cutter shaft 12 which engages a shoulder 27 on the cutter bearing to limit the downward movement. This lower limit for the cutter shaft of course determines the radius of curvature of the finished cut of the cavity in the lens. The depth of the cut is determined by the vertical position of the vertically adjustable table on which the lens is mounted. By suitable measuring instruments which will be readily understood by those skilled in this art, the radius of curvature and depth of cut may be properly and accurately determined.

I will now describe a form of lens which may be made in accordance with my present invention.

Referring to Figs. 4 and 5 in this lens the cavity 2 is formed in the concave face of the main body portion 1, and the lens is so positioned with respect to the cutter that the opposite edges of the cavity are of substantially the same depth.

The outline 29 of the elongated cavity is substantially the outline of the envelope of the circular edge 6 of the end of the cutting tool as it swings about its fixed axis.

In Fig. 6 is shown a vertical section of the lens in which the elongated cavity is deepest at the lower edge and tapers therefrom upwardly, the upper edge of the cavity being substantially flush with the inner surface of the body of the lens.

In Fig. 7 is shown a vertical cross section of the lens in which the upper part of the cavity is deepest, the cavity sloping therefrom downwardly and the lower edge of the cavity being substantially flush with the inner face of the lens.

In Fig. 8 is shown a horizontal view of the lens in which the cavity is deepest at the inner portion of the lens, the cavity sloping therefrom outwardly, the outer edge of the cavity being substantially flush with the inner surface of the lens.

In Fig. 9 is shown a horizontal cross section of a lens in which the outer edge of the cavity is deepest, the cavity sloping therefrom inwardly and the inner edge of the cavity being substantially flush with the inner surface of the lens. These various forms of cavity are each useful under certain circumstances and to take care of certain conditions of eyesight.

It is obvious that variations in the method employed and modifications of the lenses disclosed may be made without departing from the spirit of the invention as disclosed herein.

It will be observed that in the manufacture of this lens, no further grinding is necessary after the cavity is formed in the lens, in contradistinction to previous types in which an insert is fused into the lens and this insert has to be ground to the proper shape after fusing.

It will also be observed that there is no heating of the lens after the grinding of the cavity which might result in a distortion of the lens as in previous types where the fusing of the insert resulted in a heating of the adjacent parts of the lens.

This application is a continuation in part of my copending application, Serial No. 214,022 filed August 19, 1927.

I find that somewhat improved results are obtained by making the outer circle of the end face of the grinding tool slightly eccentric with respect to the axis about which the cutter rotates, as this construction eliminates the occasional formation of circular irregularities in the cavity which are sometimes formed when a concentric cutter is used. I have found that an eccentricity of about two millimeters is satisfactory.

I have found it very essential that every part of the circular edge of the end face of the grinding cutter should lie in a perfectly flat plane.

There is a great advantage in being able to grind the reading field of the lens in such a way that a prismatic formation is obtained between the bottom surface of the cavity 87 and the opposite surface of the lens, as by means of this a correction may be made which will take care both of the convergence necessitated because of the spacing apart of the pupils and also of the accommodation necessitated because of the inability of the muscles to take care of the flattening of the optic lens.

I claim:

1. An eyeglass lens comprising a main body portion formed with an elongated cavity in one surface thereof, the bottom surface of said cavity being spherical and forming the envelope of the circular edge of the end of a right circular cylinder, the axis of which is shifted about a fixed center.

2. An eyeglass lens comprising a main body portion formed with an elongated cavity in one surface thereof, the bottom surface of said cavity being spherical and forming the envelope of the circular edge of the end of a right circular cylinder, the axis of which is shifted about a fixed center, and the directrix of which axis is a discontinuous line.

3. An eyeglass lens comprising a main body portion formed with an elongated cavity in one surface thereof, the bottom surface of said cavity being spherical and forming the envelope of the circular edge of the end of a right circular cylinder, the axis of which is shifted about a fixed center, and the directrix of which axis is a substantially straight line.

4. An eyeglass lens comprising a main body portion formed with an elongated cavity in one surface thereof, the bottom surface of said cavity being spherical and forming the envelope of the circular edge of the end of a right circular cylinder, the axis of which is shifted about a fixed center, that portion of the lens lying between said bottom surface and the opposite surface of the lens being of prismatic formation.

5. An eyeglass lens comprising a main body portion formed with an elongated cavity in one surface thereof, the bottom surface of said cavity being spherical and forming the envelope of the circular edge of the end of a right circular cylinder, the axis of which is shifted about a fixed center, and the directrix of which axis is a discontinuous line, that portion of the lens lying between said bottom surface and the opposite surface of the lens being of prismatic formation.

6. A one-piece concavo-convex eyeglass lens of a single index of refraction, formed with an elongated cavity in its concave surface, with the bottom surface of said cavity having a different sphere-concave curvature of a greater radius than the radius of the concave surface of the lens, that portion of the lens between said bottom surface and the convex surface of said lens being of prismatic formation.

7. An eyeglass lens comprising a concave convex lens having a single index of refraction and formed with an elongated cavity in one surface thereof, the bottom surface of said cavity being spherical and forming the envelope of the circular edge of the end of a right circular cylinder, the axis of which is shifted about a fixed center.

8. An eyeglass lens comprising a concave convex lens having a single index of refraction and formed with an elongated cavity in one surface thereof, the bottom surface of said cavity being spherical and forming the envelope of the circular edge of the end of a right circular cylinder, the axis of which is shifted about a fixed center, said cavity being in a concave surface, the bottom surface of said cavity having a different spheroconcave curvature of a greater radius than the radius of the concave surface of the lens.

9. An eyeglass lens comprising a main body portion formed with an elongated cavity in one surface thereof, the bottom surface of said cavity being spherical and forming the envelope of the circular edge of the end of a right circular cylinder, the axis of which is shifted about a fixed center, the ends of said cavity being semi-circular and the sides being equi-distant from each other throughout a substantial portion of their length.

10. An eyeglass lens comprising a main body provided with two vision portions, one of said portions being of non-circular outline and having a concave surface on one side, said non-circular concave surface being spherical and forming the envelope of the circular edge of the end of a right circular cylinder, the axis of which is shifted about a fixed center.

11. An eyeglass lens comprising a main body provided with two vision portions, one of said portions being of non-circular outline and having a concave surface on one side, said non-circular concave surface being spherical and forming the envelope of the circular edge of the end of a right circular cylinder, the axis of which is shifted about a fixed center, that portion of the lens lying between said non-circular concave surface and the opposite surface of the lens being of prismatic formation.

12. An eyeglass lens comprising a main body provided with two vision portions, one of said portions being of non-circular outline and having a concave surface on one side, said non-circular concave surface being spherical and forming the envelope of the circular edge of the end of a right circular cylinder, the axis of which is shifted about a fixed center, said non-circular portion having two substantially parallel sides and two substantially semi-circular ends.

In witness whereof, I have hereunto subscribed my name.

WILLIAM R. UHLEMANN.